US011034777B2

United States Patent
Luong

(10) Patent No.: US 11,034,777 B2
(45) Date of Patent: Jun. 15, 2021

(54) SPHERICAL CHITIN NANOPARTICLES AND PROCESS FOR PREPARATION THEREOF

(71) Applicant: 9802622 CANADA INC., Quebec (CA)

(72) Inventor: John Ha-Thanh Luong, Quebec (CA)

(73) Assignee: 9802622 CANADA INC., Hampstead (CA)

( * ) Notice: Subject to any disclaimer, the term of this patent is extended or adjusted under 35 U.S.C. 154(b) by 0 days.

(21) Appl. No.: 16/343,072

(22) PCT Filed: Oct. 17, 2017

(86) PCT No.: PCT/CA2017/051229
§ 371 (c)(1),
(2) Date: Apr. 18, 2019

(87) PCT Pub. No.: WO2018/072014
PCT Pub. Date: Apr. 26, 2018

(65) Prior Publication Data
US 2019/0276564 A1    Sep. 12, 2019

Related U.S. Application Data

(60) Provisional application No. 62/409,511, filed on Oct. 18, 2016.

(51) Int. Cl.
*C08B 37/00* (2006.01)
*C08B 37/08* (2006.01)

(52) U.S. Cl.
CPC ....... *C08B 37/003* (2013.01); *Y10T 428/2982* (2015.01)

(58) Field of Classification Search
None
See application file for complete search history.

(56) References Cited

U.S. PATENT DOCUMENTS 5,607,656 A  *  3/1997  Soicke  .................... C01B 15/08
                                                                    423/513

FOREIGN PATENT DOCUMENTS

WO    2011072365 A1    6/2011
WO    2015070346 A1    5/2015

OTHER PUBLICATIONS

Fan et al.; "Chitin Nanocrystals Prepared by TEMPO-Mediated Oxidation of a-Chitin"; Biomacromolecules; 9, pp. 192-198; (2008).
International Search Report and Written Opinion; International Application No. PCT/CA2017/051229; International Filing Date Oct. 27, 2017; dated Jan. 9, 2018; 9 pages.
Tayebeh et al.; "Spherical Cellulose Nanoparticles Preparation from Waste Cotton Using a Green Method"; Powder Technology; 261; pp. 232-240; (2014).
Zhang et al.; Facile Synthesis of Spherical Cellulose Nanoparticles; Carbohydrate Polymers; 69; pp. 607-611; (2007).

* cited by examiner

*Primary Examiner* — Scott R. Walshon
*Assistant Examiner* — Thomas A Mangohig
(74) *Attorney, Agent, or Firm* — Cantor Colburn LLP

(57) ABSTRACT

This disclosure relates to carboxylated spherical crystalline chitin nanoparticles (SChNPs) having an average diameter of about 18-20 nm or less; and a process for producing same from the chitinous material, comprising contacting a chitinous material with an Oxone monopersulfate reagent (Formula (II)).

13 Claims, 5 Drawing Sheets

SPHERICAL CHITIN NANOPARTICLES AND PROCESS FOR PREPARATION THEREOF

CROSS REFERENCE TO RELATED APPLICATIONS

This application is a National Stage application of PCT/CA2017/051229, filed on Oct. 17, 2017, which claims the benefit of U.S. Provisional Application No. 62/409,511, filed on Oct. 18, 2016, both of which are incorporated by reference in their entirety herein.

FIELD OF THE DISCLOSURE

This disclosure relates to substantially spherical crystalline chitin nanoparticles (SChNPs) and a process for producing same from the chitinous material.

BACKGROUND OF THE DISCLOSURE

Chitin is the second most important natural polymer. It is a major constituent of the exoskeleton, or external skeleton, of many arthropods such as insects, spiders, and crustaceans. The annual worldwide production of chitin is about $10^{10}$-$10^{12}$ ton, using crustacean shells are the most important chitin source owing to its high content and availability. This natural polymer has a linear structure consisting of 2-acetamido-2-deoxy-D-glucopyranose (N-acetyl-D-glucosamine) units, which are linked by $\beta$-(1→4) linkage (Formula 1).

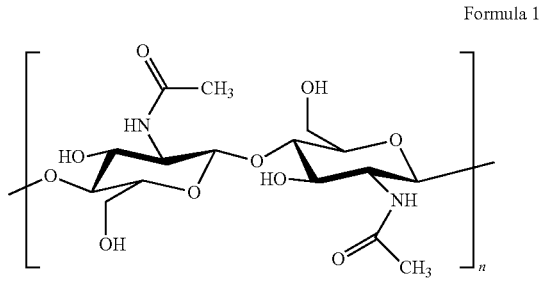

Formula 1

Formula 1 is a schematic representation of chitin wherein n represents the degree of polymerization (DP) ranging from 300 to 700 units. DPs of chitin materials vary depending on the source, production process, and treatment.

The structure of chitin comprises an acetamide group at the C2 position. This acetamide group allows for increased hydrogen bonding (intra- and inter-hydrogen bonding) between adjacent polymers and provides increased strength. The degree of acetylation is one of the most important characteristics of chitin, depending upon the raw material and the processes used for the preparation of chitin.

There are three different classes of chitin: $\alpha$-chitin, $\beta$-chitin, and $\gamma$-chitin. Although $\alpha$-chitin and $\beta$-chitin exhibit a crystalline structure, $\alpha$-chitin is composed of antiparallel chains of N-acetyl-D-glucosamine, allowing for strong intermolecular bonding. In this arrangement, the $\alpha$ (alpha)-form allows tight packaging into chitin microfibrils, consisting of ~20 single chitin chains. In contrast, $\beta$ (beta)-chitin contains chains aligned in a parallel fashion, resulting in weaker intermolecular interactions. $\gamma$ (gamma)-chitin, a hybrid between $\alpha$-chitin and $\beta$-chitin, has two parallel strands alternate with single antiparallel strands. The average molecular weights of $\alpha$-chitin, $\beta$-chitin, and $\gamma$-chitin are about 701, 612, and 524 kDa, respectively.

Chitin polymers form microfibrils (also referred to as rods or crystallites) of ~3 nm in diameter and >0.5 in length. The overall structure is stabilized by hydrogen bonds formed between the amine and carbonyl groups. Chitin microfibrils frequently associate in bundles containing parallel groups of 10 or more single microfibrils (Peters, W. et al, Entomol. Gen. (1979) 5, 241-254); Lehane, M. J. Annu. Rev. Entomol. (1997) 42, 525-550,). The anti-parallel arrangement of chitin molecules in the $\alpha$ form allows tight packaging into chitin microfibrils, consisting of ~20 single chitin chains that are stabilized by a high number of hydrogen bonds formed within and between the molecules. Owing to intra- and intermolecular hydrogen bonds, chitin can form very tightly packed crystallites to prevent the penetration of chemicals and even water.

To date, chitin has been used in agriculture, industry, and medicine for various applications. In particular, chitin would make an excellent platform for bioimaging, foods, pharmaceutics, cosmetics, biosensing, theranostics, and other bio-applications.

Processes for preparing nanoscale chitin derivatives have been reported.

Water-insoluble $\alpha$-chitin isolated from shrimp shells can be subjected to extensive treatments of acid hydrolysis and mechanical disruption to yield nanocrystals with rod shapes (see Goodrich, J. D., et al. Biomacromolecules (2007) 8 (1), 252-257).

Chitin can also be treated with TEMPO/NaBr/NaClO at pH 10 followed by mechanical disintegration to yield a stable colloidal aqueous suspension of chitin nanocrystals (see Fan, Y. et al. Biomacromolecules (2008) 9, 192-198). This procedure yields chitin nanocrystals with a coniferous shape of 6±2 nm in width and 250±110 nm in length (see Zhou J. et al. Bioconjugate Chem. (2014) 25, 640-643).

WO 2015/070346 A1 describes a process for producing rod-shaped chitin nanocrystals with diameters ranging from 3-10 nm and less than 100 nm in length. Such chitin nanocrystals also have surface carboxyls.

SUMMARY OF THE DISCLOSURE

One aspect of the disclosure relates to a process for producing spherical crystalline chitin nanoparticles (SChNPs) comprising contacting a chitinous material with an effective amount of a reagent comprising potassium peroxomonosulfate ($KHSO_5$).

One aspect of the disclosure relates to a nanosized chitin particle, wherein said particle is substantially spherical crystalline chitin nanoparticles (SChNPs) and said SChNPs have an average diameter of about 18-20 nm or less as assessed by transmission electron microscope (TEM) micrographs.

One aspect of the disclosure relates to a substantially spherical crystalline chitin nanoparticles (SChNPs) prepared by the process as defined herein.

BRIEF DESCRIPTION OF THE DRAWINGS

The present disclosure is illustrated with reference to the accompanying drawings, in which.

DETAILED DESCRIPTION OF THE DISCLOSURE

Figures 1A, 1B, 1C:
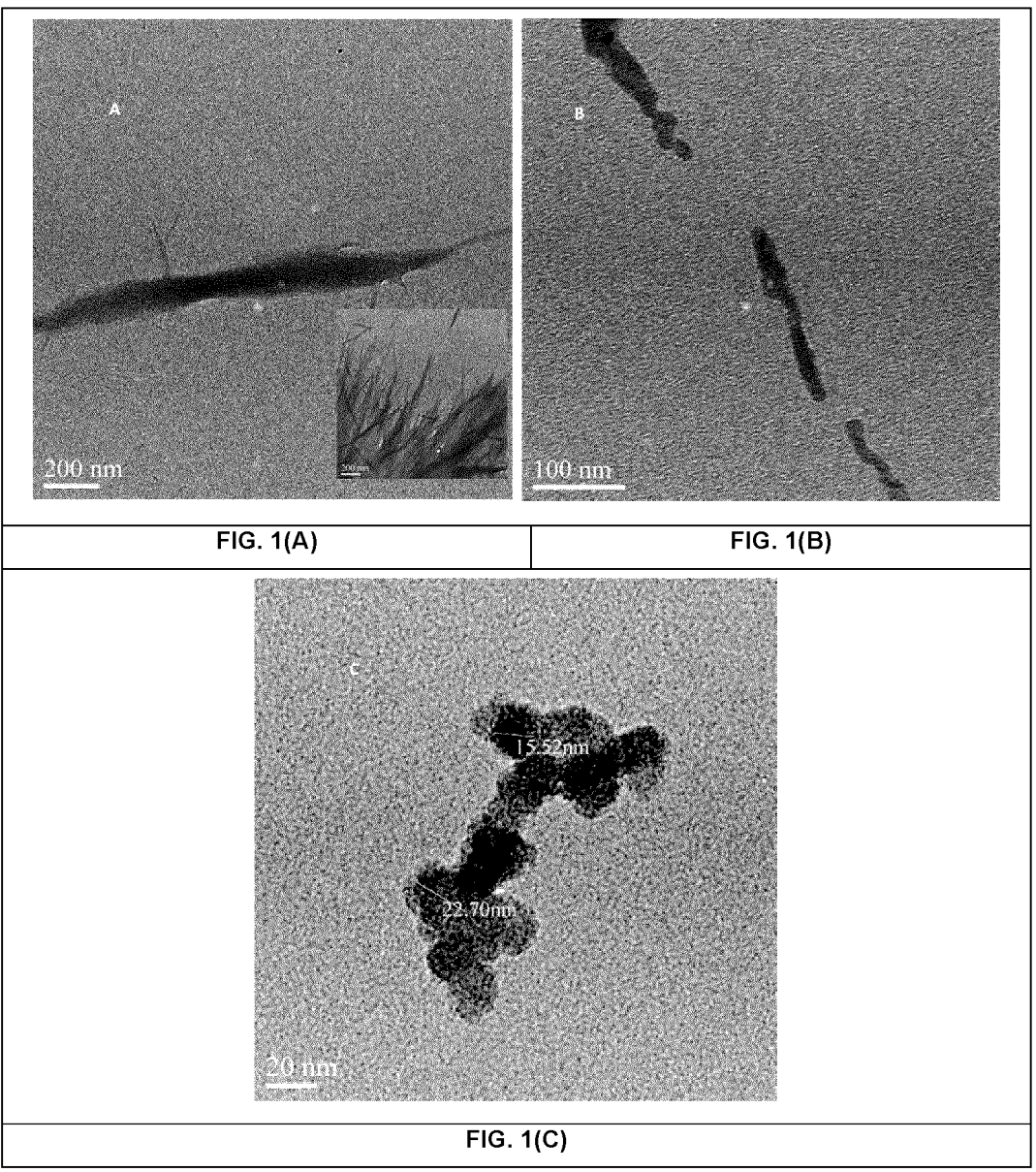
FIG. 1(A) is transmission electron microscope (TEM) micrographs of the raw starting material having a reference scale of 200 nm.
FIG. 1(B) is transmission electron microscope (TEM) micrographs of chitin treated with Oxone® having a reference scale of 100 nm.
FIG. 1(C) is transmission electron microscope (TEM) micrographs of chitin treated with Oxone® having a reference scale of 20 nm.

The present disclosure describes a process for producing substantially spherical crystalline chitin nanoparticles (SChNPs) by contacting a chitinous material with a sufficient amount of the oxidizing agent.

The process is conducted in an aqueous medium. The reagent is dissolved in the aqueous medium (preferably in water alone) at a concentration ranging from about 0.20 M to about 1.25 M, or alternatively is 0.25 to 1.2M, with the resulting pH of below about 2. The preferable concentration of the reagent is about 1 M with a corresponding pH of about 1.

The concentration of chitinous material in the aqueous medium can range from about 0.1 to about 2.5 wt/vol %, or about 0.2% to about 1 wt/vol %, or preferably is about 0.5 wt/vol % or higher. The amount is not over about 2.5 wt/vol % due to the gelation of chitin when the aqueous medium is subject to a temperature ranging from about 45-80° C.

The preferable ratio of the chitinous material to the reagent (weight percentage) is about 1:1 to about 1:10; about 1:2 to about 1:10; 1:2 to 1:5 or 1:2 to 1:3).

The process is preferably conducted at a temperature, ranging from about 40° C. to about 80° C. with constant stirring. The preferable temperature is 60±5° C.

The preferable contacting time between the chitinous material with the oxidizing agent is from about 8 hours to about 16 hours. The time may be lower, for example, 2-4 hours, if the temperature and/or Oxone concentration is (are) above the minimum amounts described in the ranges previously described.

The resulting spherical crystalline chitin nanoparticles (SChNPs) may be recovered by any suitable method, including centrifugation, filtration and/or settling and decanting.

The resulting SChNPs may further be dried by vacuum, freeze drying, or oven drying to form dried SChNPs.

The present disclosure also produces carboxylic acid groups on the surface of spherical crystalline chitin nanoparticles (SChNPs). During the oxidation step, selective oxidation preferably occurs at the C6 primary hydroxyl group of the glucose ring to form carboxylic acid groups with a degree of oxidation (DO) of from 0.005 to 0.010 or 0.04 to 0.10.

Chitin nanoparticles SChNPs have an average diameter of about 18-20 nm or less as assessed by transmission electron microscope (TEM) micrographs, depending the contacting time. As prepared SChNPs with carboxylic groups can be neutralized with sodium hydroxide, potassium hydroxide or ammonium hydroxide to enhance water solubility and dispersion.

Spherical crystalline chitin nanoparticles (SChNPs) exhibit a similar crystallinity index (CRI), compared to microcrystalline chitin, one of the substrates used for the preparation of SChNPs. Advantageously, the CRI may be at least 10% greater than the CRI of the starting chitinous material such as carton board and wood pulp.

In brief, the present process describes a procedure for producing SChNPs with substantially similar or enhanced uniformity and crystallinity compared to the starting raw material. In contrast, both acid hydrolysis and ammonium persulfate oxidation produce rodshaped like materials. The present disclosure presents a new methodology of green chemistry, which uses an inexpensive reagent, and may even use, in certain embodiments, water as the sole aqueous medium, for the reaction and purification steps. The reaction is carried out at a temperature no higher than about 80° C. The waste product, potassium sulfate, resulting from the process, is a non-flammable white crystalline salt, that is commonly used in fertilizers, providing both potassium and sulfur.

Spherical crystalline chitin nanoparticles (SChNPs) produced by the present process are carboxylated, which renders them more water soluble and amenable to bioconjugation for the synthesis of bionanocomposites. Biodegradable SChNPs with biocompatibility, non-toxicity, and renewability will foster a plethora of diversified applications such as drug delivery, biosensing/bioimaging, pharmaceutical formulation, cosmetics, food, textiles, aerogels, etc. Chitin nanoparticles degrade faster than metallic nanoparticles or carbon-based materials such as fullerenes and carbon nanotubes. SChNPs are expected to have low toxicity and low environmental risk, which are significantly lower than those for carbon nanotubes and other fibers. Thus, their applications for biomedical applications are promising towards the production of implants, face masks, drug delivery, cell carriers, artificial blood vessels, etc. They may be decorated with antimicrobial agents for applications in wound dressing, bandage, and hygienic products.

As used herein, the expression "chitinous material" refers to a reagent suitable for use in the present disclosure, comprising a sufficient amount of chitin. Preferably the expression "chitinous material" refers to actual chitin content. For example, technical or purified grades chitin reagent may be used. In one embodiment, the chitin source may be crustaceans, fungi, mushrooms, insects or any combination thereof. In one embodiment, the source may be shrimps, crabs or any combination thereof. In one embodiment, □-chitin can be used. In one embodiment, β-chitin can be used. In one embodiment, □-chitin can be used. In one embodiment, a mixture comprising one or more of □-chitin, β-chitin and □-chitin can be used.

As used herein, the reagent is comprising potassium peroxomonosulfate ($KHSO_5$). Oxone®, for example, is a tri-salt comprising $KHSO_5 \cdot 0.5KHSO_4 \cdot 0.5K_2SO_4$ (MW=307.38), has the active component potassium peroxomonosulfate ($KHSO_5$) as the oxidant. Oxone® is soluble and stable in water. At 20° C., the solubility of Oxone® in water is 277 g/L or 0.9 M. At 60° C. (140° F.), the solubility of Oxone® is about 387 g/L or 1.26 M.

In one embodiment, the reagent is comprising the tri-salt $KHSO_5 \cdot 0.5KHSO_4 \cdot 0.5K_2SO_4$.

In one embodiment, the reagent is consisting essentially (or consisting) of the tri-salt $KHSO_5 \cdot 0.5KHSO_4 \cdot 0.5K_2SO_4$.

As used herein, the expression "aqueous medium" refers a process reaction medium comprising water. In one embodiment, the aqueous medium is water as the sole component.

EXAMPLES

Oxone® monopersulfate ($KHSO_5 \cdot 0.5KHSO_4 \cdot 0.5K_2SO_4$) and the chitin powder ($C_8H_{13}NO_5$)n, practical grade prepared and isolated from shrimp shells, (Catalog #C7170-100G and cas no is 1398-61-4) were obtained from Sigma-Aldrich.

Preparation of Spherical Crystalline Chitin Nanoparticles

The off-white chitin powder (0.2-1 g) was added to a 1 M Oxone® aqueous solution (100 mL, pH 1). The suspension was heated to 60° C. with vigorous stirring for up to 14-16 h to give a white suspension. The suspension was centrifuged (10,000 rpm) for 15 min. The supernatant was decanted, and about 50 mL of deionized water was added to the pellet, followed by 5 min of vigorous mixing. The centrifugation/washing cycles were repeated 5 times until the solution pH of 7 was reached. The product was placed in a vacuum chamber overnight to give a white powder. During the treatment of microcrystalline chitin with Oxone®, selective oxidation was effected at the C6 primary hydroxyl group of the glucose molecule subunit to form carboxylic acid groups. The Oxone® was effective in cleavage of the glycosidic bonds and etching out individualization of elementary fibrils to form crystalline chitin nanoparticles.

Characterization

Transmission electron microscopy (TEM) was performed by the Transmission Electron Microscope, JEM-1400, JEOL, equipped with a Bottom CCD 2×2 k camera. For TEM imaging, the particle-containing sample was dispersed in deionized water and subject to bath sonication. Three small droplets from the resulting suspension were then applied on a carbon-coated copper TEM grid and vacuum dried in a covered plastic dish.

The TEM micrographs show chitin treated with 1 M Oxone. The TEM micrograph in FIG. 1(A) shows the oxidation and etching capability of Oxone® to hydrolyze the β(1-4) bonding of chitin (20-50 μm) to form shorter fibers (<0.5 μm in diameter and 5 μm in length) and then smaller fibers. FIG. 1(B) shows a close view of such fibers revealed the formation of spherical nanoparticles. FIG. 1(C) shows that nanoparticles are formed on the fiber surface, about 25 nm in diameter. It is believed that the active potassium peroxymonosulfate ($KHSO_5$) first attacked the terminal glucosidic bond of the chitin chain to loosen up the crystallites to allow the penetration of water and Oxone®. Like acids, $KHSO_5$ was capable of hydrolyzing the β(1→4) bonds, and the presence of water renders each broken bond inactive.

The X-ray diffraction (XRD) pattern was probed by a Bruker D8 Advance or with Philips PW1050 X-ray diffractometer (Cu Kα radiation, operating at 40 kV/30 mA with a 0.0019 step size and a 0.5 s step). The collected XRD data were analyzed using FullProf to provide peak position (2θ, 2theta), FWHM (full-width half maximum), peak deconvolution, and integration intensity for the estimation of the crystallinity index (CRI). Crystallite sizes were determined by the Scherrer equation as K λ/(FWHM. cos θ) with the Scherrer constant (K) 1 and λ=1.542 A. The $d_{hk}$z-spacing is calculated as λ/2 sin θ.

Figure 2:
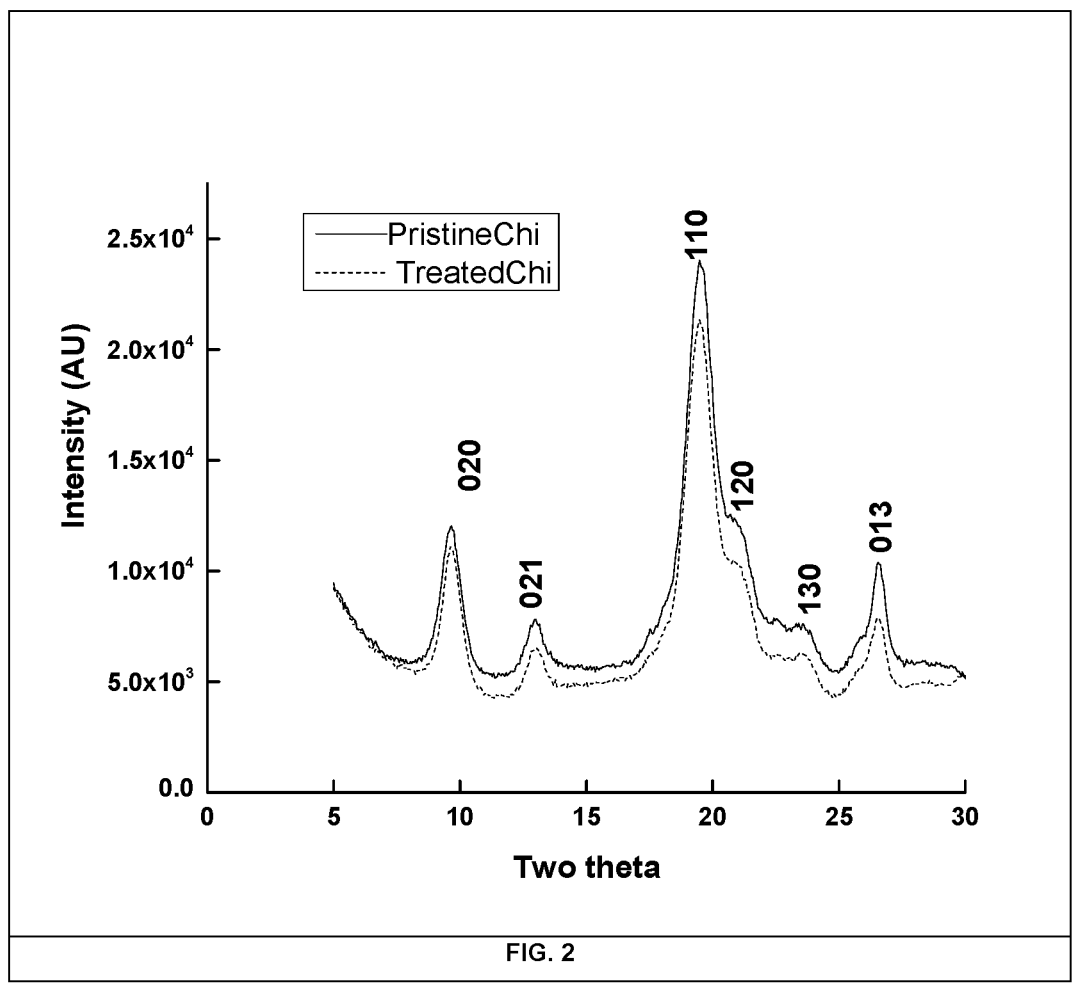
FIG. 2 depicts the XRD diffractograms of pristine chitin and SChNPs in accordance with the present disclosure.

FIG. 2 depicts the XRD diffractograms of pristine chitin and the resulting SChNPs in accordance with the present disclosure from the treatment with 1 M Oxone for 12 hours at 60° C. The XRD diffractogram of pristine chitin exhibited the most intense peak (110) at 19.37° together with a shoulder 20.85° with three other smaller peaks at 12.94, 23.35, and 26.49°. This is a typical XRD signature of α-chitin. After the treatment with Oxone®, the intensity of the highest peak (110) and other peaks diminished slightly. However, the amorphous region, ranging from 15 to 16° also decreased slightly. The XRD procedure was used to examine the diffractogram of chitin during the course of treatment with Oxone®. The crystallinity index (CRI) was then estimated using the formula suggested by Lavall et al. (Bioresour. Technol. (2007) 98, 2465-2472) as follows:

$$CRI = \frac{I_{110} - I_{am}}{I_{110}}$$

where $I_{110}$ and $I_{am}$ are the intensity of the peak at 19.37 and ~16°, respectively.

The starting chitin material exhibited a CRI of 77% compared to 77.5% for spherical chitin nanoparticles. Such a result indicated that spherical chitin nanoparticles retained crystallinity after the treatment by Oxone®.

Detailed analysis of the diffractograms for the starting chitin and spherical chitin nanoparticles using the FullProf software is summarized in Table 1.

TABLE 1

Crystallographic characteristics of the starting chitin and spherical chitin nanoparticles using Fullprof

| Materials | Peak position (°)- Peak index | d-(hkl) spacing (Å) vs the literature value | Apparent size (Å)* | Average maximal strain (Å)** |
|---|---|---|---|---|
| Starting chitin | 9.63 (020) | 9.18 (9.54)*** | 91.07 (SD = 0.70) | 294 (SD = 113) |
| | 13 (021) | 6.80 (6.94) | | |
| | 19.47 (110) | 4.55 (4.59) | | |
| | 20.83 (120) | 4.26 (4.29) | | |
| | 22.40 (130) | 3.96 (3.76) | | |
| | 26.52 (013) | 3.36 (3.36) | | 353 (137) |
| Treated chitin (spherical chitin nanoparticles) | 9.63 (020) | 9.18 | 75.59 (SD = 0.59) | |
| | 13.05 (021) | 6.78 | | |
| | 19.44 (110) | 4.56 | | |
| | 20.95 (120) | 4.24 | | |
| | 22.95 (130) | 3.87 | | |
| | 26.46 (013) | 3.36 | | |

*Apparent size is estimated as 1/beta* where beta* is the integral breadth given in reciprocal lattice unit (1/angstrom) * 1000. The parameter beta* is calculated using the De Keijser formula (De Keijser et al. J. Appl. Cryst., (1982) 15, 308-314).
**Maximal strain = ½ beta* × strain × d (hkl).
***The value in the bracket of column 3 is obtained from Mogilevskaya et al (Polymer Science, Ser. A (2006) 48 (2), 116-123).

It is well known that the unit cell of chitin has the space symmetry group $P2_12_12_1$ (orthorhombic) with the parameters a=0.469 nm (interchain distance), b=1.913 nm, and c=1.043 nm (along the chain) (Dweltz, N. E. Biochem. Biophys. Acta (1960) 44, 416-435; Paralikar et al. J. Polym. Sci., Part C: Polym. Lett. (1984) 22, 543-546,).

EFTIR spectroscopy as a powerful tool for studying the physicochemical and conformational properties of crystalline chitin nanoparticles. Attenuated Total Reflection (ATR)-FTIR is performed using microcrystalline chitin PH-101 and the vacuum-dried powder of crystalline chitin nanoparticles (Bruker Optics, Billerica, Mass., USA, FT-IR spectrometer equipped with a diamond tip). The spectral region between 4000 and 400 $cm^{-1}$ was scanned.

Figure 3:
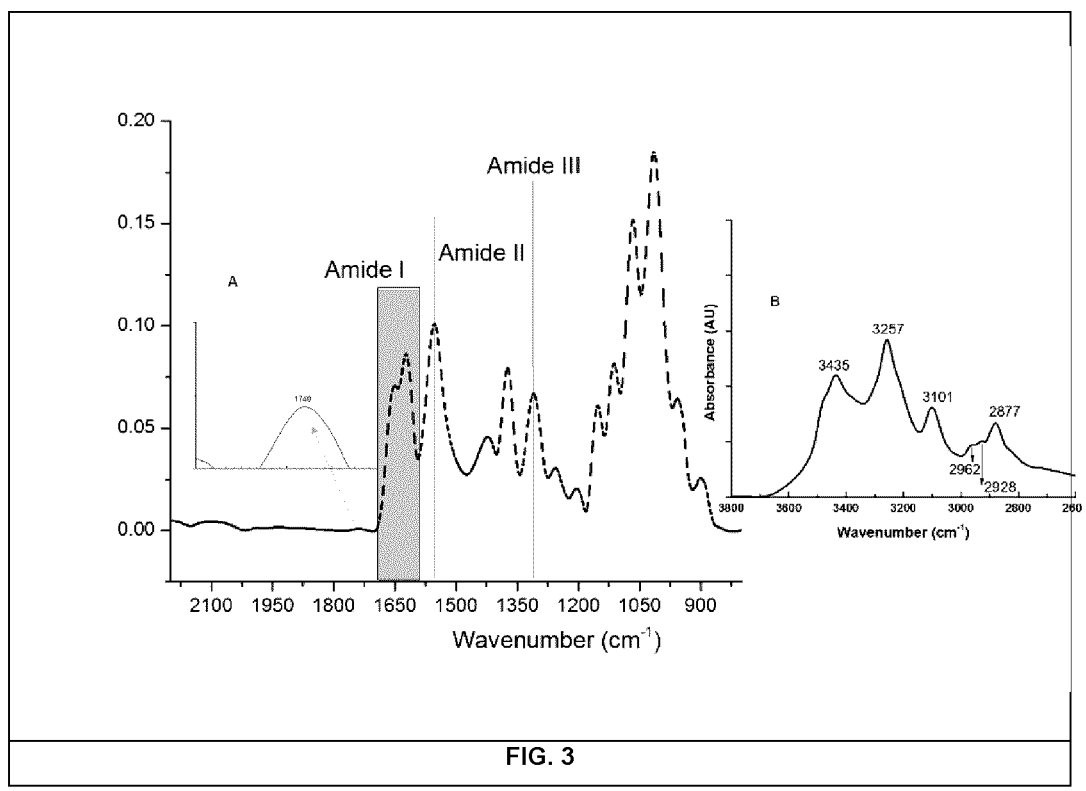
FIG. 3 depicts the FTIR spectrogram of SChNPs in accordance with the present disclosure.

As shown in FIG. 3, FTIR shows the amide I vibration modes at 1651 and 1622 $cm^{-1}$, a signature of whereas the β-chitin shows only one band at 1656 $cm^{-1}$ (Cardenas et al. J. Appl Pol. Sci. (2004) 93(4), 1876-1885). The band splitting has been attributed to the influence of hydrogen bonding or the presence of an enol form of the amide moiety (Pearson et al. *J. Polym. Sci.* (1960) 13, 101-116; Focher et al. *Carbohydr. Polym.* (1992) 17, 97-102). In brief, about 50% carbonyl groups form hydrogen intra-bonding with the amino group in the same chitin chain, as reflected by the band at 1656 $cm^{-1}$. The remaining groups form the same intrabonding but also bond with the —$CH_2OH$ of the side chain, as represented by a small peak at 1620 $cm^{-1}$. The amide II band is observed at 1554 $cm^{-1}$ for α-chitin, and this band has been identified for both chitin allomorphs: at 1558 $cm^{-1}$ for α-chitin and 1562 $cm^{-1}$ for β-chitin (Brunner et al. *J. Struct. Biol.* (2009), 168, 539-547). This band is used as the characteristic band of N-acetylation whereas the amide III band is observed at 1309 $cm^{-1}$. The band at 3257 $cm^{-1}$ is assigned for $\nu$(N—H) in secondary amides only with trans-configuration (NH—CO groups), was further confirmed additionally by a lower intensity band at 3101 $cm^{-1}$. The presence of methyl group was proved by the corresponding stretching vibrations of these groups in the range 2962-2877 $cm^{-1}$. The wide peak at 3435 $cm^{-1}$ indicated that the hydrogen interactions are less accentuated, or the presence of free hydroxyl groups, i.e., this band was contributed by $\nu$(N—H), $\nu$(O—H) and $\nu$($NH_2$). The band at 1377 $cm^{-1}$ is related to the symmetrical deformation of the $CH_3$ group. The absorption bands in the 1420-900 $cm^{-1}$ region illustrated the presence of $CH_3$, $CH_2$ and $C_H$ groups as well as the primary and secondary OH groups, attached to the pyranose ring. Of importance is the presence of a small peak at 1740 $cm^{-1}$, a distinct stretching peak for the COOH group on chitin, resulting from the treatment with Oxone® (the inset of FIG. 3, left). The peak associated with the —C—O—C— stretch of the β-1,4-glycosidic linkage in chitin was observed at 1151 $cm^{-1}$, which is comparable to the —C—O—C— stretch of cellulose. The assignment of other bands is summarized in Table 2.

TABLE 2

FTIR peak identification for SChNPs

| Peak identification | Starting chitin | Treated chitin (spherical chitin nanoparticles) |
|---|---|---|
| OH | 3429 | 3435 |
| Amide A (as NH) | 3261 | 3257 |
| Amide B (sNH) | 3102 | 3101 |
| $asCH_3$ | 2960 | 2962 |
| $sCH_2$ | 2929 | 2928 |
| $sCH_3$ | 2877 | 2877 |
| COOH | Non-detectable | 1740 |
| Amide I (C=O) | 1654 | 1651 |
| Amide I (C=O) | 1622 | 1622 |
| Amide II (CN and NH) | 1554 | 1554 |
| $CH_2$ | 1428 | 1421 |
| CH & C—$CH_3$ | 1376 | 1373 |
| Amide III (CN and NH) | 1308 | 1309 |
| NH | 1260 | 1255 |
| C—O—C | 1155 | 1151 |
| C—O | 1113 | 1113 |
| C—O | 1069 | 1067 |
| C—O | 1025 | 1016 |
| $CH_3$ | 952 | 957 |
| CH | 896 | 897 |

Estimation of the degree of acetylation of SChNPs is conducted using the ratio of $A_{1655}/(1.33*A_{3450})$ from the FTIR spectrum (Kasaai, et al. Carbohydr Polym (2008) 71, 497-508; Domard et al. Int J Biol Macromol (1983) 5, 49-52). $A_{1655}$ is the absorbance of the amide I (C=O) peak, and $A_{3450}$ is the absorbance of the wide peak, which was contributed by $\nu$(N—H), $\nu$(O—H) and $\nu$($NH_2$). In this case, the estimated DA value was close to 100%, in agreement with the solid NMR procedure.

Solid State NMR

NMR measurements were performed on a Bruker 11.7T Avance$^{III}$ spectrometer equipped with a 4 mm VTN CPMAS probe at spinning rates of 8 and 10 kHz. $^{13}C$ CP experiments employed a $^1H$ 90° pulse of 2.4 μs, followed by a 2.5 ms CP contact time using ramped field on $^1H$ (40 to 80 kHz) and 51 kHz field on $^{13}C$ and composite-pulse $^1H$ decoupling using the SPINAL64 sequence with RF field of 94 kHz during acquisition. $^{13}C$ CPMAS spectra were collected with 20150 scans on spherical chitin nanoparticles with a recycle delay of 3 s.

Figure 4:
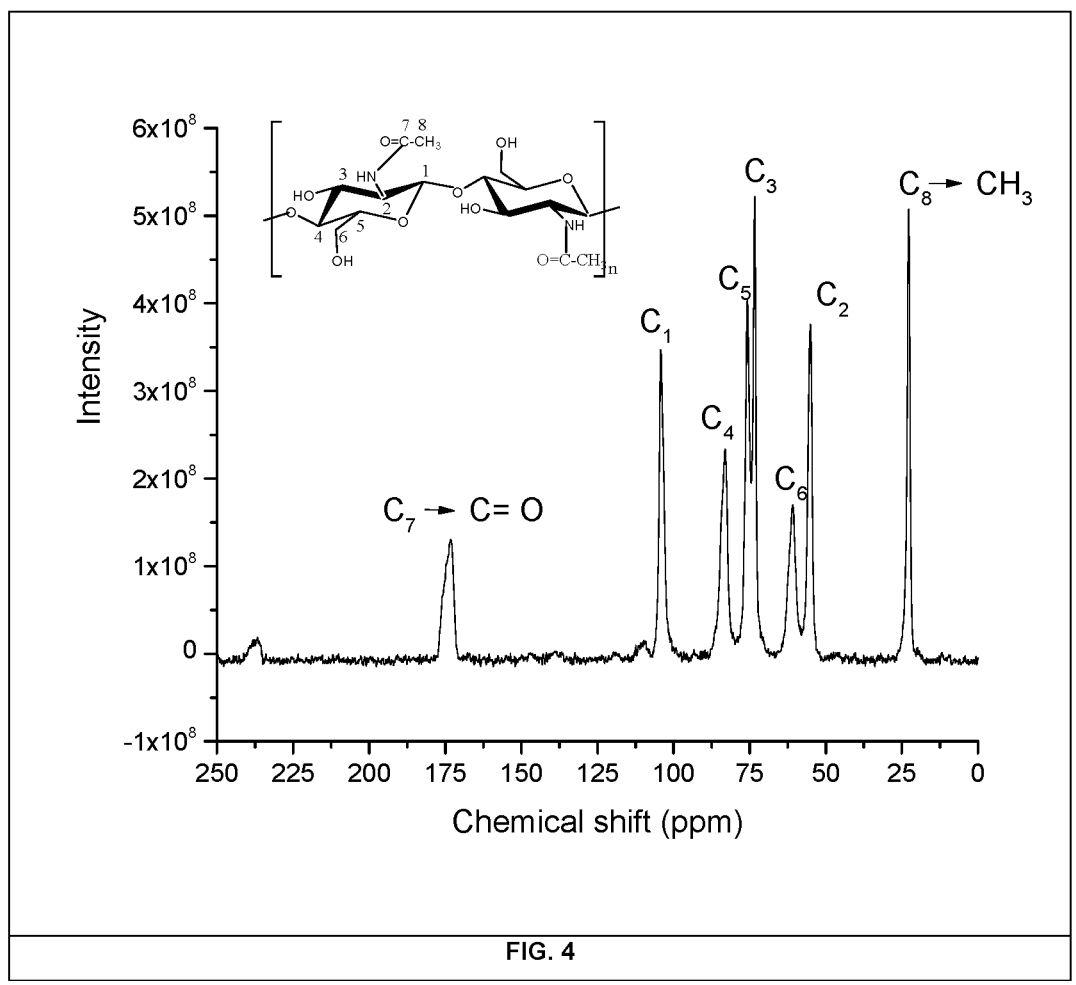
FIG. 4 is a $^{13}C$ solid state NMR spectrum of SChNPs in accordance with the present disclosure.
Figure 5:
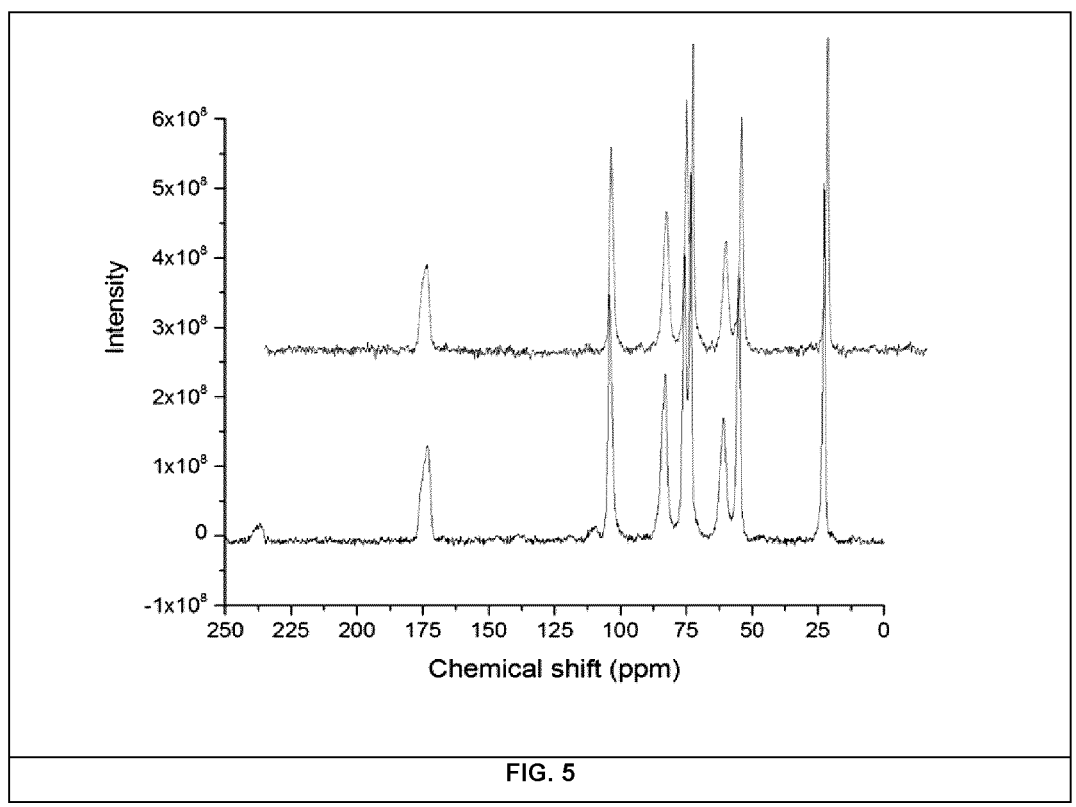
FIG. 5 illustrates the $^{13}C$ solid-state NMR of SChNPs in accordance with the present disclosure compared with the rod-shaped chitin nanocrystals (top curve).

FIG. 4 depicts the solid-state NMR signature of SChNPs. The whole spectrum shows the assignment of peaks to the carbons in a glucopyranose repeat unit (C1-C6) and the acetamide group (C7-C8) as shown in FIG. 4. A broad peak (C=O) at 175 ppm deserves a brief comment here since this peak has been reported as a doublet when recorded at 7.05 T. Indeed, this is a singlet but is split by the effect of the $^{14}N$ quadrupole coupling (Tanner et al. Macromolecules (1990) 23: 357643). However, the splitting disappears when the spectrum is acquired at higher field strength whereas this peak becomes broader at lower field strength. The spectrum is almost identical to that of unmodified α-chitin (Jang et al. J. Polymer Sci. Part A: Polymer Chem. (2004) 42, 3423-3432; Luong et al. WO 2015070346) A doublet, sharply resolved around 73 and 75 ppm (C3-C5, resulting from the hydrogen formed), is the typical signature for the α-form whereas β-chitin exhibits a singlet around 74 ppm, and γ-chitin has two signals around 73 and 75 ppm (Jang et al.). The solid-state $^{13}C$ NMR obtained for spherical chitin nanoparticles is comparable to that of rod-shaped chitin nanocrystals regarding peak position, peak height, peak area, and peak sharpness (FIG. 5). The degree of acetylation estimated using the procedure suggested by Heux et al. (Biomacromolecules (2000) 1, 746-751) is about 99%, comparable to the value reported by Luong et al. (supra). (98%) for rod-shaped chitin nanocrystals. This value was also observed for the starting chitinous material, illustrating the use of Oxone® for the preparation of SChNPs did not affect the acetamide group. Indeed, deacetylation only occurs when chitin is subjected to concentrated alkali solutions (45%) at 80° C. or higher under a nitrogen atmosphere (Yuan et al. Materials (2011) 4, 1399-1416). This is the typical condition for the preparation of chitosan from chitin. In contrast, the preparation of spherical chitin nanoparticles was carried out under ambient atmosphere at pH 1 using 1 M Oxone®. Thus, the acetamide remained intact during the course of treatment with 1 M Oxone®.

The degree of deacetylation (DD) is determined by measuring the integral of the carbonyl or methyl group divided by the integral of all the carbon atoms in the backbone. DA (degree of acetylation) is estimated as $6*I_{CH3}/(I_{C1}+I_{C2}+I_{C3}+I_{C4}+I_{C5}+I_{C6})$. Among various techniques, $^{13}C$ solid-state NMR has been proven as the most reliable for the evaluation of the acetyl content (Heux et al.).

FIG. 5 illustrates the $^{13}C$ solid-state NMR of SChNPs, prepared by Oxone® (bottom curve) vs rod-shaped chitin nanocrystals (top curve). The figure for the rod-shaped chitin nanocrystals was obtained from Luong et al. (supra) for comparison.

The foregoing disclosure of the exemplary embodiments has been presented for purposes of illustration and description. It is not intended to be exhaustive or to limit the claims to the precise forms disclosed. Many variations and modifications of the embodiments described herein will be apparent to one of ordinary skill in the art in light of the above disclosure. The scope of the invention is to be defined only by the claims appended hereto.

The invention claimed is:

1. A process for producing spherical crystalline chitin nanoparticles (SChNPs) comprising contacting a chitinous material with an effective amount $KHSO_5 \cdot 0.5KHSO_4 \cdot 0.5K_2SO_4$.

2. The process of claim 1, wherein the wt/wt ratio of the chitinous material to the reagent is from about 1:1 to about 1:10.

3. The process of claim 1, wherein said process is conducted at a temperature ranging from about 40° C. to about 80° C.

4. The process of claim 1, wherein said process is conducted in an aqueous medium.

5. The process of claim 4, wherein the concentration of the chitinous material in the aqueous medium ranges from about 0.1 to about 2.5 wt/vol %.

6. The process of claim 4, wherein said reagent is present in the aqueous medium at a concentration ranging from about 0.20 M to about 1.25 M.

7. The process of claim 6, wherein the concentration of the chitinous material in the aqueous medium ranges from about 0.1 to about 2.5 wt/vol %.

8. The process of claim 1, wherein said chitinous material comprises chitin from crustaceans, fungi, mushrooms, insects, or any combination thereof.

9. The process of claim 8, wherein the wt/wt ratio of the chitinous material to the reagent is from about 1:1 to about 1:10.

10. The process of claim 1, wherein said SChNPs is recovered.

11. The process of claim 10, wherein said SChNPs is further dried.

12. Substantially spherical crystalline chitin nanoparticles (SChNPs) prepared by the process as defined in claim 1.

13. Nanosized chitin particles, wherein said particles are substantially spherical crystalline chitin nanoparticles (SChNPs), and said SChNPs have an average diameter of about 18-20 nm or less as measured by transmission electron microscope (TEM) micrographs.

* * * * *